United States Patent [19]

Horikawa

[11] Patent Number: 5,393,802
[45] Date of Patent: Feb. 28, 1995

[54] WEIGHT FOR ADJUSTING BALANCE OF A ROTATING BODY

[75] Inventor: Fumihiro Horikawa, Hachioji, Japan
[73] Assignee: Three Bond Co., Ltd., Tokyo, Japan
[21] Appl. No.: 78,295
[22] PCT Filed: Oct. 6, 1992
[86] PCT No.: PCT/JP92/01295
  § 371 Date: Jun. 25, 1993
  § 102(e) Date: Jun. 25, 1993
[87] PCT Pub. No.: WO93/13334
  PCT Pub. Date: Jul. 8, 1993

[30] Foreign Application Priority Data
Dec. 27, 1991 [JP] Japan .................. 3-358272

[51] Int. Cl.$^6$ .................................. C08F 2/46
[52] U.S. Cl. .......................... 522/81; 522/83
[58] Field of Search ........................... 522/81, 83

[56] References Cited

U.S. PATENT DOCUMENTS

| | | | |
|---|---|---|---|
| 4,309,334 | 1/1982 | Valitsky | 522/17 |
| 4,425,287 | 1/1984 | Hesse | 522/66 |
| 4,923,905 | 5/1990 | Masuhara | 522/81 |
| 5,013,768 | 5/1991 | Kiriyama | 522/81 |

OTHER PUBLICATIONS

Patent Abstracts of Japan, vol. 012141, (M691), Apr. 28, 1988, JP-A-62 261 733, Nov. 13, 1987.

*Primary Examiner*—Marion E. McCamish
*Assistant Examiner*—Mark A. Chapman
*Attorney, Agent, or Firm*—Oblon, Spivak, McClelland, Maier, & Neustadt

[57] ABSTRACT

A weight for adjusting balance of a rotating body obtained by adding and mixing one or two or more sorts of solid spherical powders selected from silicated glass, boro-silicated glass and phosphate glass to and with ultraviolet curing resin. The weight has improved specific gravity which is capable of sufficiently hardening even the inner part thereof without remaining an unhardened part in a short time only by being exposed to ultraviolet rays and suitable for a rotating body such as a rotor in a motor of a brushless outer rotor type or a brush motor and a polygon mirror for use in a laser printer because the powder particles thereof can be intimately bonded with one another through the adhesive resin.

1 Claim, No Drawings

WEIGHT FOR ADJUSTING BALANCE OF A ROTATING BODY

RELEVANT TECHNICAL FIELD

This invention relates to an ultraviolet curing weight for adjusting the balance of a rotating body, which is capable of adjusting the dynamic balance of the rotating body, on rotating, such as a motor and a polygon mirror.

BACKGROUND OF THE ART

As a weight for adjusting the balance of a rotating body such as a rotor in a motor of a brushless outer-rotor type or a brush motor and a polygon mirror for use in a laser printer, there have been used adhesives of epoxy resin singly or combined with powder having large specific gravity such as metal powder.

Furthermore, the adhesives obtained by adding glass having large specific gravity such as lead oxide, titanium oxide and barium oxide to the ultraviolet curing resin have been allowed for. These adhesives (weight means) have been used in such a manner that they are filled in a part of the rotating body and hardened in order to adjust the balance of the rotating body.

However, in the case of using the singly composed adhesive as a weight, the quantity of the adhesive to be applied becomes increased because the adhesive alone is as small as about 1 in specific gravity. Thus, there cannot be secured room for accommodating the designated amount of adhesive in a small-sized motor, and consequently, sufficient adjustment of the balance of the rotor in the motor cannot be fulfilled.

The adhesive obtained by adding powder having large specific gravity to epoxy resin has also suffered a disadvantage such that the number of processes for producing the adhesive of two-fluid mixing type is increased because a mixing process is necessary therefor, and there is a possibility that the specific gravity of the adhesive is reduced due to air bubbles being possibly merged into the adhesive in the heating process.

The adhesive of single-fluid type requires a heating process in production, and therefore, is unfavorable for mass-production. When an article to be supplied with the adhesive has plastic component parts, disadvantageously, it must be kept away from heat brought about in the heating process for hardening the adhesive.

In order to eliminate the aforementioned drawbacks, it has been attempted to add lead oxide, titanium oxide, barium oxide or the like to an adhesive resin which is hardened by active-energy rays. However, ultraviolet curing resin alone has been generally used as a weight. Thus, such a resin adhesive is likely to become thinner on hardening and takes much time to be hardened. Moreover, the resin adhesive entailed a disadvantage such that unhardened part of the adhesive applied to an object still remains to unbalance the object, and adjustment of the balance of the object becomes insufficient.

DESCRIPTION OF THE INVENTION

To solve the problems as mentioned above, the present invention provides a weight for adjusting the balance of a rotating body, which is obtained by adding and mixing one or two or more sorts of solid spherical powders selected from silicated glass, boro-silicated glass and phosphate glass to and with ultraviolet curing resin.

To the weight composition which is obtained by adding and mixing one or two or more sorts of solid spherical powders selected from silicated glass, boro-silicated glass and phosphate glass to and with ultraviolet curing resin, there may be added one or two or more sorts of solid spherical powders selected from glass of $TiO_2$—$BaO$—$SiO_2$ group, glass of $BaO$—$ZnO$—$SiO_2$ group and lead glass.

The ultraviolet curing resin used in this invention may include a polymerization initiator, a polymerization inhibitor, gum, elastomers, a silane coupling agent and/or a filler as occasion demands, other than polymeric oligomers and monomers polymerizable with ultraviolet rays.

As the polymeric oligomer as noted above, there may be used a compound having at least one ethylene double bond structure capable of polymerizing. To put it concretely, there can be enumerated (meta) acrylates such as polyurethane (meta) acrylate, epoxy (meta) acrylate, polyester (meta) acrylate, and compounds denatured with vinyl group or allyl group.

As the polymerizable monomer as noted above, there can be enumerated vinyl monomers such as (meta) acrylic esters, (meta) acrylamides, styrene and vinylpyrrolidone and allyl monomers such as allyl benzene and allyl morpholine.

As the polymerization initiator as noted above, there can be enumerated a photopolymerization initiator such as benzophenone, diethoxy acetophenone, Michler's ketone, benzoin, benzoin alkyl ether, hydroxycyclohexyl ketone, benzil dimethylketal, thioxanthone and diethyloxanthone, a polymerization initiator which is polymerized with heat produced by peroxides, and an anaerobic polymerization initiator.

The powder to be mixed with the ultraviolet curing resin in this invention may be selected from silicated glass, boro-silicated glass and phosphate glass which are high in permeability of ultraviolet rays and large in specific gravity so as not to exert a bad influence upon curing of the ultraviolet curing resin. To put it concretely, there can be enumerated silica glass, soda-lime glass and boro-aluminosilicated glass.

The specific gravity of the powder is preferably 2.0 or more. It is more important to make the powder solid, but not hollow, than the condition as to the specific gravity.

Furthermore, the grain of the powder has to be shaped in a sphere in consideration of light permeability, light non-directional property and charging efficiency. In a case of the powder having disordered grain shapes such as fumed silica which has a non-spherical shape, the powder cannot be charged densely nor increased sufficiently in specific gravity.

The grain size of the powder is preferably about 5 to 500 $\mu$m taking the charging efficiency and discharging property thereof into consideration. It is desirable to control the distribution of the grain size in consideration of the viscosity, fluidity and charging efficiency.

The powder of glass of $TiO_2$—$BaO$—$SiO_2$ group, glass of $BaO$—$ZnO$—$SiO_2$ group or lead glass is required to be shaped in a sphere by the same reason as in the glass components as noted above.

In this case, though the powder of about 5 to 500 $\mu$m in grain size can be used, the powder being small in grain size decreases its hardenability when forming a thick layer, and alternatively, the powder being large in grain size is difficult to restrain its precipitation. Thus, it is desirable to use the powder of about 40 to 200 μm in grain size.

The powder of glass of TiO₂—BaO—SiO₂ group, glass of BaO—ZnO—SiO₂ group or lead glass is low in light permeability in comparison with the aforementioned spherical glass, resulting in a lowering of hardenability when resultantly forming a thick adhesive layer as a weight. However, these components are higher in specific gravity and light permeability in comparison with other possibly compositions having specific gravity equal to or higher than these components.

Therefore, when a space for accommodating the resultant adhesive in an objective article is limited, the specific gravity of the weight can be increased without impairing the hardenability of the thick adhesive layer, by combining various glass compositions.

An arbitrary quantity of the powder may be added to and mixed with the adhesive. However, when the quantity of the powder to be added to the adhesive is insufficient, the effect of increasing the specific gravity of the weight cannot be produced, and alternatively, when the powder is added to excess, the discharging property and adhesive property of the adhesive are marred. Thus, it is preferable to determine the quantity of the glass to be mixed with the adhesive to 100 to 500 parts by weight per resin of 100 parts by weight regardless of the components of a mixture.

The weight of the present invention can be produced in such the same way as any other conventional adhesive of this type and applied for a rotating body such as a rotor in a motor of a brushless outer rotor type or a brush motor and a polygon mirror for use in a laser printer.

PREFERRED MODES FOR EXECUTING THE INVENTION

One embodiment of the present invention will be described hereinafter.

EMBODIMENTS 1 and 2

A weight composition was prepared by combining ultraviolet curing resin of urethane acrylates (trade name "TB3042C" made by Three Bond Co., Ltd.) with soda glass beads having a specific gravity of 2.5 and a grain size of 45 μm or less (trade name "GB731B" made by Toshiba Ballotini Co., Ltd.), soda glass beads having a specific gravity of 2.5 and a grain size of 106 to 250 μm (trade name "GP105A" made by Toshiba Ballotini Co., Ltd.), glass beads of TiO₂—BaO—SiO₂ having a specific gravity of 4.3 and a grain size of 53 to 74 μm (trade name "HGB253" made by Toshiba Ballotini Co., Ltd.), and silica powder (disordered in shape) having a specific gravity of 2.5 and a 100 mesh in grain size (trade name "CRYSTALLITE MESH 100") in the combining proportion (part by weight) shown in Table 1 below. The weight composition thus obtained was filled in a cylinder of polyethylene in the state shielded completely from light and hardened on exposure to ultraviolet rays with accumulated light volume of 3000 mJ/cm². Then, the specific gravity and thickness of the weight hardened like a film layer were measured.

TABLE 1

|  | Embodiment 1 | Embodiment 2 | Comparative Example 1 | Comparative Example 2 | Comparative Example 3 | Comparative Example 4 |
|---|---|---|---|---|---|---|
| TB3042C | 100 | 100 | 100 | 100 | 100 | 100 |
| GB731B | 250 | 200 |  |  |  |  |
| GP105A | 100 | 100 |  |  |  |  |
| CRYSTALLITE 100 MESH |  |  |  | 150 | 350 |  |
| HGB253 |  | 100 |  |  |  | 350 |
| Gravity | 1.80 | 2.13 | 1.10 | 1.62 | Unmixable | 2.60 |
| Thickness of Hardened layer (mm) | 4.2 | 2.3 | 4.5 | 2.4 | Unmixable | 0.5 |

The specific gravity shown in Table was measured at 25° C. by use of a specific gravity cup after subjecting the specimen to vacuum degassing.

The thickness of the hardened part of the weight separated from the part remaining in its gel state, which was obtained in such a manner that the weight composition was filled in the cylinder of polyethylene having a diameter of 7 φmm in the state shielded from light and hardened on exposure to ultraviolet rays with accumulated light volume of 3000 mJ/cm² was measured by use of a micrometer.

As is clear from the experimental result mentioned above, the weight composition (Embodiment 1 or 2) obtained by combining ultraviolet curing resin (TB3042C) with soda glass beads (GB731B and GP105A) or glass beads of TiO₂—BaO—SiO₂ (HGB253) is higher in specific gravity and larger in hardened layer thickness than comparative compositions (Comparative Examples 1 to 4) made by combining ultraviolet curing resin (TB3042C) with silica powder disordered in shape (trade name "CRYSTALLITE MESH 100").

As is apparent from the foregoing, since the weight composition according to this invention can be obtained by combining ultraviolet curing resin with one or more solid spherical powders selected from silicated glass, boro-silicated glass and phosphate glass which are high in permeability of ultraviolet rays so as not to exert a bad influence upon curing of the ultraviolet curing resin, it can be hardened in a short time only by being exposed to ultraviolet rays without need for a heating process.

Furthermore, according to this invention, the weight adhesive, even the inner part thereof, can be sufficiently hardened without remaining an unhardened part of the adhesive. Even when the aforenoted solid spherical powder is filled densely, the powder particles can be intimately bonded with one another through the adhesive resin, so that a weight having high specific gravity can be obtained for suitably adjusting the balance of a rotating body.

INDUSTRIAL APPLICABILITY

Thus, the weight composition of this invention, which is applicable for a rotating body such as a rotor in a motor of a brushless outer rotor type or a brush motor and a polygon mirror for use in a laser printer, can be manufactured by a shortened manufacturing line without need for a heating process.

I claim

1. A weight for adjusting the balance of a rotating body, comprising:

an ultraviolet curing resin;

a spherical powder constituted of at least one powdered glass selected from the group consisting of silicate glass, boro-silicate glass and phosphate glass, said spherical powder having a specific gravity of 0.2 or more; and a spherical powder constituted of at least one glass powder selected from the group consisting of $TiO_2$—$BaO$—$SiO_2$, $BaO$—$ZnO$—$SiO_2$ and lead glass.

* * * * *